March 20, 1928.  
C. H. LOGUE  
1,663,085  
APPARATUS FOR TESTING BEVEL GEAR TEETH  
Filed April 16, 1926  
4 Sheets-Sheet 1
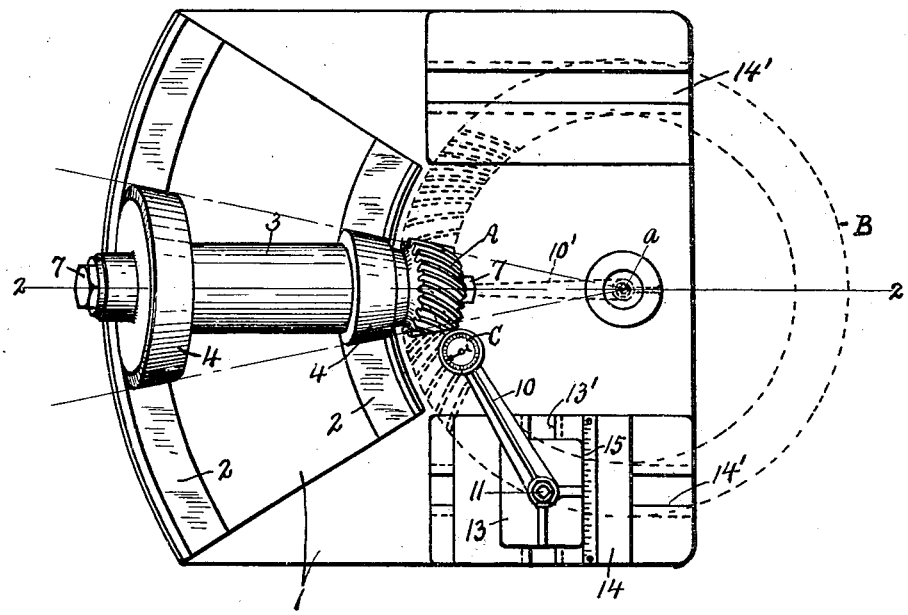
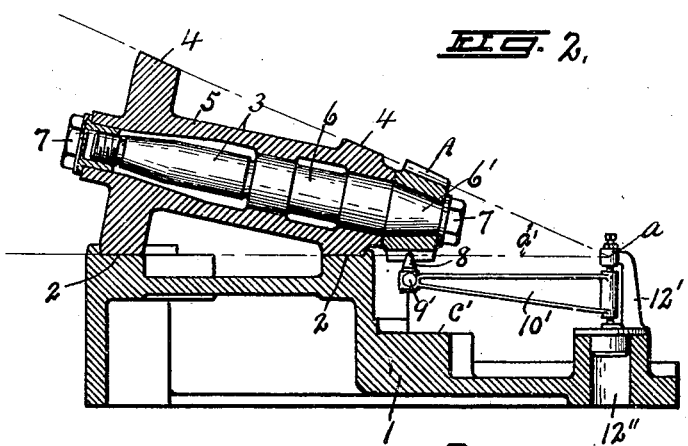
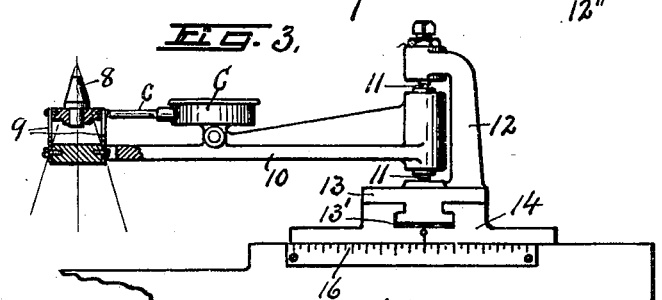

March 20, 1928.

C. H. LOGUE 1,663,085

APPARATUS FOR TESTING BEVEL GEAR TEETH

Filed April 16, 1926

WITNESS

INVENTOR
C. H. Logue
BY Denison + Thompson
ATTORNEYS

March 20, 1928.  
C. H. LOGUE  
1,663,085  
APPARATUS FOR TESTING BEVEL GEAR TEETH  
Filed April 16, 1926 4 Sheets-Sheet 3

WITNESS  
H. Hurst.

INVENTOR  
C. H. Logue  
BY Denison & Thompson  
ATTORNEYS

March 20, 1928.
C. H. LOGUE
1,663,085
APPARATUS FOR TESTING BEVEL GEAR TEETH
Filed April 16, 1926
4 Sheets-Sheet 4
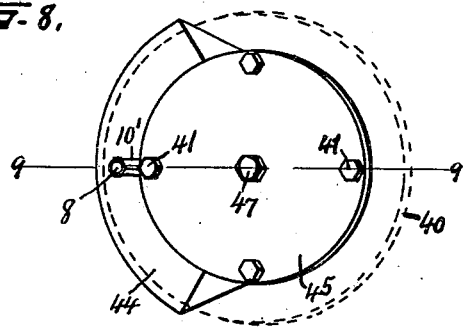
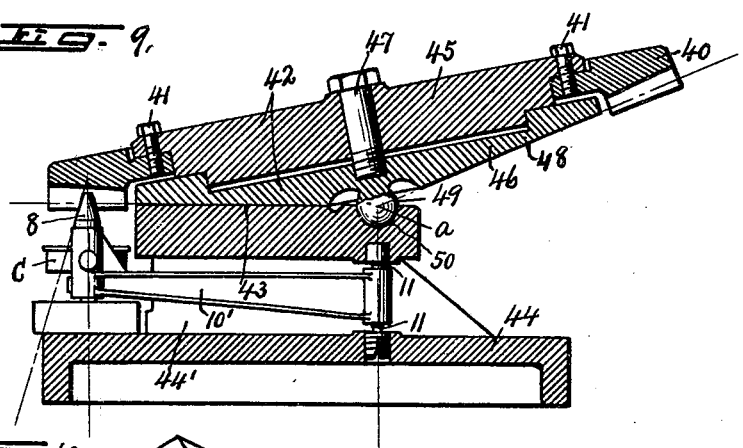
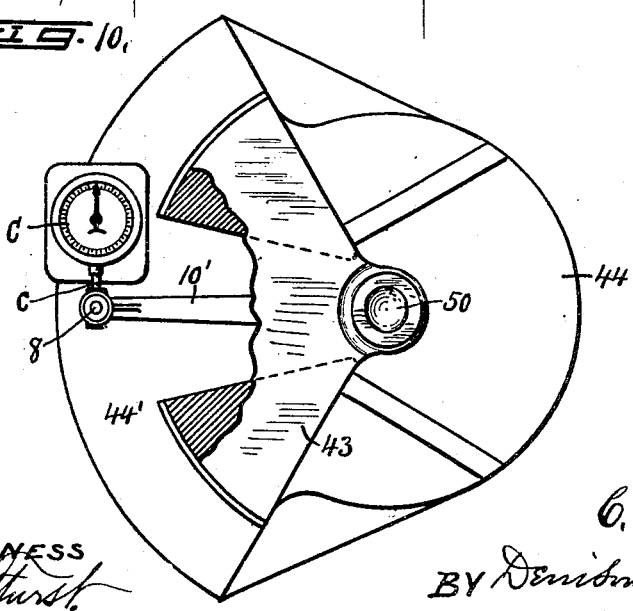

Patented Mar. 20, 1928.

1,663,085

UNITED STATES PATENT OFFICE.

CHARLES H. LOGUE, OF SYRACUSE, NEW YORK, ASSIGNOR TO THE GEAR GRINDING MACHINE COMPANY, OF DETROIT, MICHIGAN.

APPARATUS FOR TESTING BEVEL-GEAR TEETH.

Application filed April 16, 1926. Serial No. 102,368.

This invention relates to a method of and apparatus for testing the teeth of bevel gears for the purpose of locating any inaccuracy or error which may exist in the profile or contour of any tooth so that the imperfection may be expeditiously remedied by regrinding or other suitable treatment.

In bevel gears the cone angles, apex distances and angles of obliquity of the teeth and also the cutting radius of spiral teeth are usually known or may be easily calculated to form a basis reasonably accurate for the construction of the mechanism employed in testing the contour or profile of the teeth which, as previously stated consists in rolling the gear under test about the apex of its cone with the face of one of its teeth in contact with the face of a test tooth of similar angular obliquity and simultaneously measuring the relative motion of one of the parts due to inaccuracy in the formation of the tooth under test.

The main object is to provide a more practicable, expeditious and efficient method for determining the presence of imperfections in the teeth of bevel gears than has heretofore been practised by simply rolling the gear about the apex of its cone with the tooth under test in contact with a master tooth of the same angular obliquity.

One of the specific objects is to support the gear upon a co-axial rolling carriage having a conical surface corresponding to the pitch cone and apex distance of the gear and adapted to roll along and upon a substantially flat track or supporting surface which is co-incident with one side of the pitch cone of the gear so that the rolling motion of the carriage along its track will impart a corresponding rolling motion of the gear under test in a manner similar to the action of companion gears when their teeth are theoretically perfect so that when the gear under test is rolled along the track with its tooth under test in contact with a master tooth any appreciable imperfection in the profile or contour of the tooth will produce a corresponding movement of the master tooth which movement may be registered by the application of a suitable dial tester thereto.

Other objects and uses relating to specific parts of the device will be brought out in the following description.

In the drawings:—

Figure 1 is a top plan of one form of my invention for testing the teeth of spiral gears and also showing by dotted lines the manner of testing radial teeth of beveled gears.

Figure 2 is a vertical sectional view taken on line 2—2, Figure 1, showing the means for testing straight teeth.

Figure 3 is a side elevation of the carrier for the master tooth together with a dial indicator on the carrier shown in Figure 1 for indicating movements of the master tooth due to inaccuracies in the gear tooth under test when in rolling contact therewith.

Figure 8 is a top plan of a further modification for testing the teeth of gear-rings in which the gear support is adapted to roll about its apex with its teeth in contact with a movable test tooth, the gear ring being shown by dotted lines.

Figure 9 is an enlarged sectional view taken on line 9—9, Figure 8, showing the gear ring in testing position.

Figure 10 is a top plan, partly in section, of the supporting bed and indicator shown in Figures 8 and 9.

Figure 4:
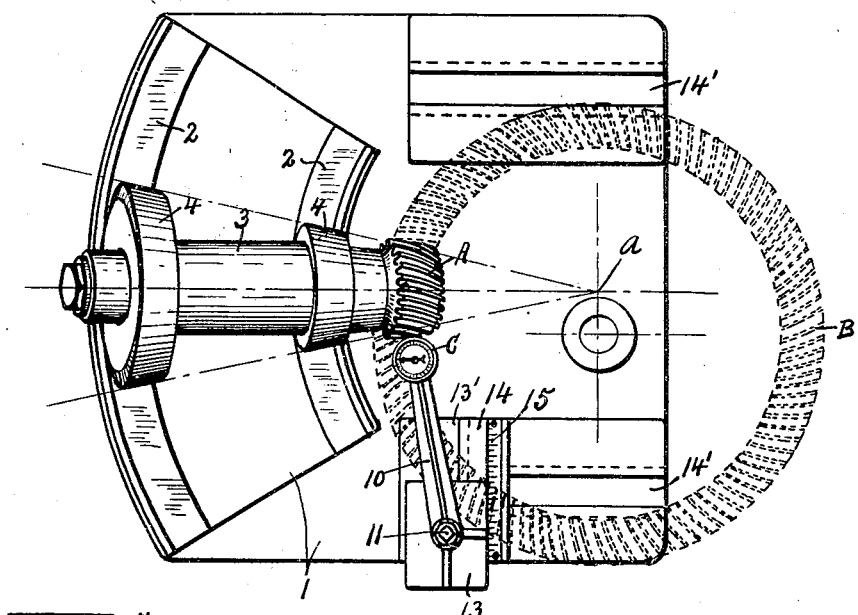
Figure 4 is a top plan similar to Figure 1 except that the apex of the cone for the gear under test is in offset relation to that of the gear with which it is adapted to mesh.

The device shown in Figure 1 is adapted to be used for testing the teeth of spiral gears and comprises a main supporting bed —1— having one or more circular track surfaces —2— which are preferably disposed in a horizontal plane of and concentric with the apex as —a— of the pitch cone as —a'— of the gear as —A— under test.

This gear is mounted upon a carriage —3— having annular conical rims —4— coincident with the cone pitch lines —a'— of the gear —A— under test adapted to roll along and upon the track surfaces —2— about the apex —a— of the gear cone.

The carriage —3— comprises a hollow member —5— and a mandrel —6— axially extending therethrough and co-axial therewith.

The gear —A— is preferably provided with a tapered bore and fitted tightly upon a tapered portion —6'— of the mandrel —6— which is provided with threaded ends engaged by nuts —7— and —7'— by which the gear —A— is clamped to the mandrel and the mandrel firmly clamped to the member —5— so that the gear may roll with the carriage about the apex —a— of the gear cone, it being understood that the gear —A— will be supported the proper radial distance from said apex corresponding to the radius of the companion gear with which it is adapted to mesh and that the carriage —3— is preferably rolled along the track surfaces —2— by hand in testing the teeth of the gear —a—.

The means for detecting the errors or imperfections in the contour or profile of the teeth of the gear —A— comprises a master tooth —8— mounted yieldingly through the medium of one or more spring arms —9— upon one end of a supporting arm —10— having its other end pivoted by trunnions —11— to a suitable bracket —12— which in turn is supported by relatively movable slides —13— and —14— upon the main supporting frame or bed —1—.

The slide —13— is movable along a rectilinear guideway —13'— in the member —14— which in turn is movable in a rectilinear guideway —14'— in the main supporting frame or bed —1— substantially tangential to the companion gear —B— shown by dotted lines in Figure 1, said guideways being disposed at right angles to each other to permit the axis of the swinging arm —10— to be adjusted to a position approximately co-incident with the center of curvature of the spiral teeth of the gear —a— when the latter is rolled to its testing position in contact with the test tooth —8—.

That is, the distance between the axis of movement of the swinging arm —10— and axis of the test tooth —8— corresponds approximately to the radius of curvature of the spiral teeth of the gear under test and the sliding members —13— and —14— permit the axis of the swinging arm —10— to be adjusted to approximately the center of said curvature parallel with the axis of the companion gear —B—.

The supporting arm —10— for the test tooth —8— is arranged to support said test tooth directly under and in contact with the tooth at the lower side of the gear —A— when the axis of said gear is brought to a position directly over the point of the test tooth or other testing position.

This test tooth —8— is tapered at an angle to correspond to the angle of obliquity of the gear teeth under test and is adapted to enter the space between adjacent teeth leaving sufficient clearance for movement of the test tooth against the action of its retracting springs —9— by any inaccuracy which may exist in the profile of the surface of the tooth under test.

Suitable scales —15— and —16— may be provided upon the sliding member —14— and main supporting bed —1— to facilitate the proper position of the axis of the arm —10— at the center of curvature of the gear tooth under test and also to properly position the test tooth —8— at the testing point.

Any suitable means may be employed for measuring or indicating movements of the test tooth —8— by imperfections in the contour of the tooth under test during the testing operation, said means consisting in this instance of the standard form of dial indicator —C— mounted upon the arm —10— and provided with the usual plunger —c— adapted to contact with one side of the spring support for the test tooth as shown more clearly in Figure 3.

In testing the teeth of spiral gears —A— the slides —13— and —14— are first adjusted to bring the axis of the radius arm —10— at approximately the center of curvature of the tooth of the gear when the latter is brought to the testing position, the radius arm —10— being then adjusted about its axis to bring the test tooth —8— into contact with the gear tooth under test.

Then by rolling the carriage —3— back and forth along the track surfaces —2— different portions of the face of the tooth under test will be brought into contact with the test tooth —8— in a manner similar to the action of the teeth of the gear under test with the teeth of its companion gear.

If, during this rolling action of the carriage —3— along the track surfaces —2—, any imperfection in the profile or contour of the tooth surface under test exists it will move the test tooth laterally against the action of its springs —9— and plunger —c— thereby effecting the operation of the pointer of the indicator to show the position and amount of error in said profile or contour.

The carriage —3— with the gear to be tested thereon is easily portable and is free to be lifted from the track —2— to permit it to be adjusted angularly for repeating the testing operation upon all of the teeth, it being understood that the indicator —C— and its plunger —c— will be arranged at the side of the test tooth —8— opposite that which engages the tooth surface under test.

In testing bevel gears having straight or radial teeth a bracket as —12— as shown in Figure 2 is supported in a socket or opening —12″— co-axial with the axis companion gear —B— or co-incident with the cone apex of the gear under test thus bringing the axis of movement of the radius arm as —10′— in the same co-axial relation to the companion gear and cone apex so that the test tooth —8— may be brought into contact with the face of the tooth under test or when the axis of the gear —A—, test tooth —8— and swinging arm —10′— are in the same vertical plane.

Under these last-named conditions the carriage —3— and gear —A— under test may be rolled along the track surfaces in the manner previously described for testing the accuracy of the teeth through the medium of the test tooth —8— in which case an indicator as —C— may be placed upon a supporting ledge as —c′— of the base —1— with its plunger —c— in contact with a surface —9′— on the head of the arm —10′— for indicating any lateral swinging movement of the test tooth —8— due to imperfections in the contour of the tooth under test.

The base —1— is preferably provided with a pair of guides —14′— at opposite sides of the cone apex —a— to permit the use of the testing device for testing opposite faces of each gear tooth.

The construction shown in Figure 4 is substantially the same as that described for Figures 1 and 3, except that the axis of the cone of the gear is offset to one side of the axis of the companion gear and that the angle of inclination of the teeth under test is somewhat less than that shown in Figure 1 necessitating the adjusting of the testing device along the guides —13′— and —14′— to different positions than is shown in Figure 1, otherwise the same reference letters apply to the construction shown in Figure 4.

Figure 5:
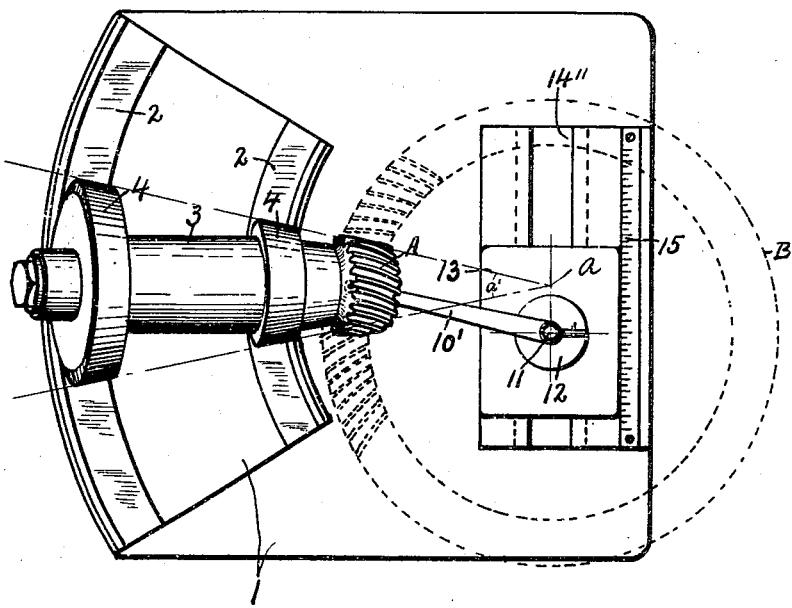
Figure 5 is a top plan similar to Figure 4 showing a modified supporting means for the master or test tooth.

The construction shown in Figure 5 is also quite similar to that shown in Figure 4 except that the supporting slide for the radius arm —10′— is mounted directly upon a fixed guide —14″— on the bed —1— diametrically of the companion gear —B— and that the slide as —13— is adjusted so as to bring the axis of movement of the arm —10— co-axial with the companion gear —B— with the test tooth in contact with the gear tooth under test in which case a dial indicator similar to that shown in Figures 9 and 10 may be placed upon the upper surface of the supporting bed with its plunger in contact with one side of the free end of the arm —10— for indicating any lateral movement of said arm due to inaccuracy in the contour of the tooth under test.

Figure 6:
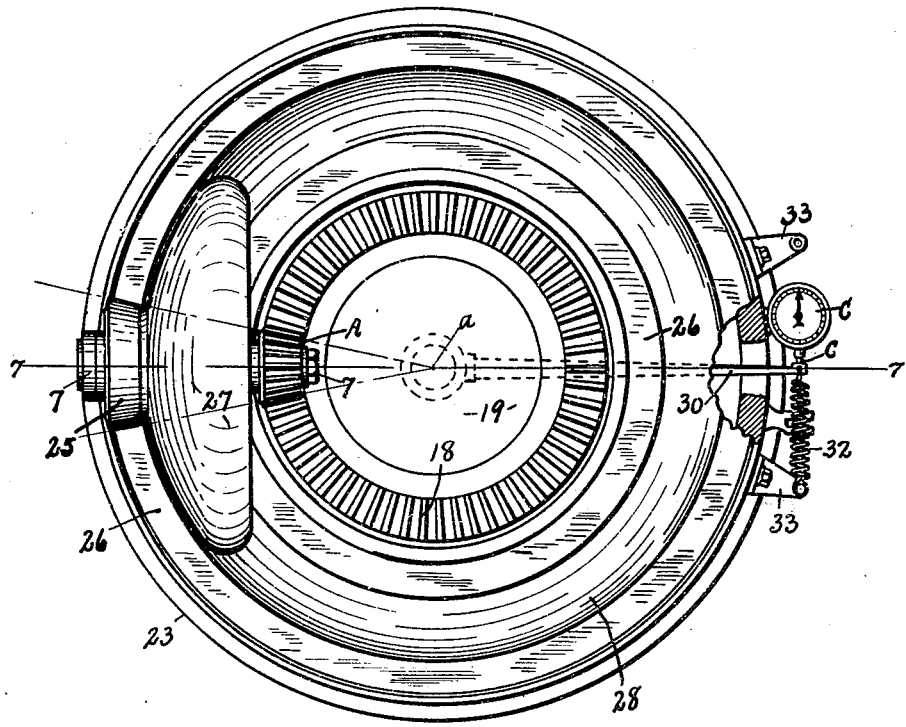
Figure 6 is a top plan of a further modified form of my invention in which the pinion under test is rolled about its apex in contact with the teeth of a master gear having means for operating an indicator in case the master gear should be moved about its axis by imperfections in the teeth of the pinion.
Figure 7:
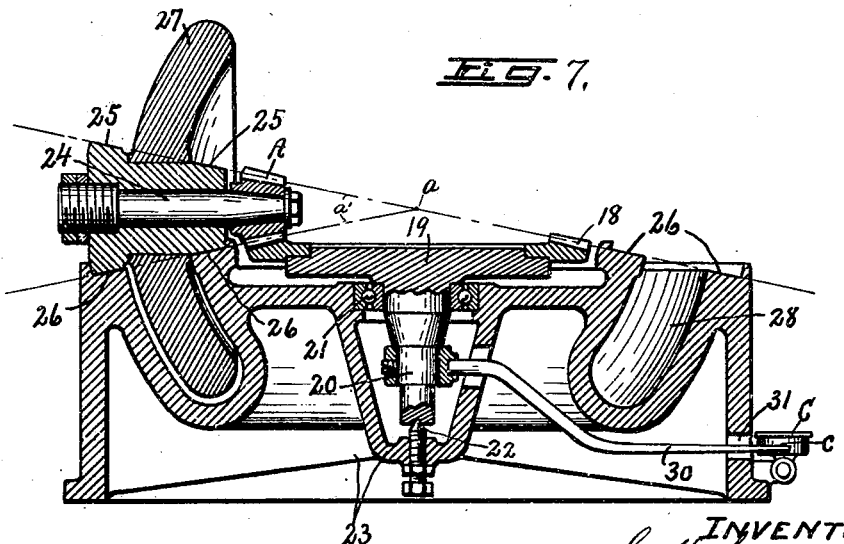
Figure 7 is a sectional view taken on line 7—7, Figure 6.

In Figures 6 and 7 is shown a device for testing gear rings in which a master gear ring —18— is mounted upon a revoluble carrier —19— having a co-axial stem —20— journaled in suitable bearings —21— and —22— on a main supporting bed or frame —23—.

The gear as —A— under test is mounted upon a rolling carriage —24— having co-axial annular bearings —25— movable along circular track surfaces —26— similar to the track surfaces —2— except that they are disposed in an inclined plane passing through the conical apexes of the gears —A— and —18—.

The track surfaces —26— are concentric with the axis of the master gear —18— and also with the conical apex —a— around which the carriage —24— is adapted to be rolled and for this purpose is provided with a hand wheel —27— movable in a circular guideway —28— in the bed —23—. Secured to the hub or stem of the angularly movable table —19— is a test arm —30— extending through an opening —31— in one side of the bed —23— and having its free end adapted to contact with the plunger —c— of an indicator —C— which is supported upon the outer surface of the bed —23—.

A coiled spring —32— is secured at one end to a bracket —33— on the bed —23— and has its other end connected to the free end of the arm —30— for yieldingly holding the teeth of the master gear —18— in contact with the teeth of the gear —A— under test to avoid backlash or lost motion between the teeth of both gears and thereby to assure a more accurate testing of the teeth of the gear —A—, it being understood that the spring —32— is rather light and just sufficient to maintain the desired contact between the teeth of said gears.

In testing the gear —A— the carriage —24— with the gear thereon is rolled along the track surface —26— about the conical apex —a— and in contact with the teeth of the master gear —18— and if any inaccuracies exist in the contour of the teeth of the gear —A— it will be transmitted to the master gear and thence through the table —19— and arm —30— to the indicator —C— to enable the operator to locate such inaccuracy for subsequent correction.

In Figures 8 to 10 inclusive a beveled gear ring —40— to be tested is secured by bolts —41— to a carrier —42— which is adapted to be rolled around the apex as —a— of the pitch cone of the gear —40— upon a track surface —43— of a supporting bed —44—.

The rolling carriage —42— for the gear ring —40— is preferably composed of circular co-axial sections —45— and —46— secured together by a co-axial bolt —47—, the section —46— being provided with an annular conical face —48— adapted to roll along upon the track surface —43— about the apex —a—, said section —46— being provided with a central ball —49— seated in a spherical socket to form therewith a universal joint whereby the entire carriage may be not only rolled about the apex —a— but may also be tilted to permit it to be adjusted angularly for registering different teeth with the master tooth as —8—.

This master tooth is mounted upon the free end of a supporting arm —10'— which is pivoted by trunnions —11— to the bed —44— to swing in an opening —44'— therein, the axis of movement of said arm being in line with the cone apex —a—.

A dial indicator —C— is mounted upon the bed —44— with its plunger —c— in contact with one side of the free end of the arm —10'— as shown in Figure 10 for transmitting motion from said arm to the pointer of the dial in case the arm should be moved laterally following imperfections in the profile or contour of the gear tooth under test.

It will be noted that in all of the modifications shown and described the bevel gear under test is movable about the apex of its pitch cone with the face of one or more of its teeth in contact with a master tooth or gear from which motion is transmitted to an indicator as —C— in case of imperfections in the contour of the gear tooth for not only locating the imperfections for indicating the amount of deviation from a perfect contour.

What I claim is:—

1. In a device for testing the teeth of bevel gears, a test tooth, movable supporting means for said tooth, means for supporting the gear to move about the apex of a cone corresponding to the pitch cone of the gear with a tooth of the gear in contact with the test tooth.

2. In a device for testing the teeth of bevel gears, a test tooth, movable supporting means for said tooth, means for supporting the gear to move about the apex of a cone corresponding to the pitch cone of the gear with a tooth of the gear in contact with the test tooth, and means for measuring the amount of movement of the test due to inaccuracy in the contour of the gear tooth under test.

3. A device for testing bevel gear teeth comprising revoluble supporting means for the gear under test movable about the apex of a cone corresponding to the cone pitch of the gear, means caused by said movement for effecting a rotary motion of the gear about its axis, a movable test tooth, and means for movably supporting the test tooth in position to mesh with the gear teeth under test whereby an error in the profile of the tooth being tested will cause a movement of the test tooth.

4. A device for testing bevel gear teeth comprising revoluble supporting means for the gear under test movable about the apex of a cone corresponding to the cone pitch of the gear, means caused by said movement for effecting a rotary motion of the gear about its axis, a movable test tooth, and means for movably supporting the test tooth in position to mesh with the gear teeth under test whereby an error in the profile of the tooth being tested will cause a movement of the test tooth, and means for indicating the amount of the last-named movement.

5. In a device for testing bevel gear teeth, a track surface, a conical roller in rolling contact with said surface about its apex, the angle of the cone of the roller corresponding to the cone angle of the gear on the pitch circle, means for securing the gear under test co-axially to the roller to roll therewith, a master tooth, means for supporting the master tooth movably in contact with the gear tooth under test whereby an error in the profile of the gear tooth will effect a movement of the master tooth and its supporting means, and means for indicating the amount of the last-named movement.

6. In a device for testing bevel gear teeth, means for supporting the gear under test to roll about the apex of a cone corresponding to the cone pitch of the gear, a master tooth, and means for supporting the master tooth movably in contact with the gear tooth under test whereby an imperfection in the profile of the gear tooth will effect a movement of the master tooth and its supporting means.

7. In a device for testing bevel gear teeth, means for supporting the gear under test to roll about the apex of a cone corresponding to the cone pitch of the gear, a master tooth, means for supporting the master tooth movably in contact with the gear tooth under test whereby an imperfection in the profile of the gear tooth will effect a movement of the master tooth and its supporting means, and means for indicating the amount of movement of said master tooth and its supporting means.

8. In a device for testing bevel gear teeth, a circular track surface, a conical roller in rolling contact with said track surface about the axis of the circular track, means for securing said gear co-axially to the roller with the apex of its conical angle in said axis, a master tooth supported movably in contact with the gear tooth under test to be moved by imperfections in the gear tooth as the roller is rolled along the track surface, and means for indicating the amount of said movement of the master tooth.

9. In a device for testing bevel gear teeth, a conical roller having means for supporting the gear to be tested with its pitch circle coincident with the conical angle of the roller, said roller being movable about the apex of its cone, a track surface along which the conical roller is adapted to be rolled and a master tooth movably supported in one side of said angle and in contact with the gear tooth under test whereby imperfections in said gear tooth will cause movement of the master tooth during the rolling action of the gear.

10. In a device for testing bevel gear teeth, a conical roller having means for supporting the gear to be tested with its pitch circle coincident with the conical angle of the roller, said roller being movable about the apex of its cone, a track surface along which the conical roller is adapted to be rolled and a master tooth movably supported in one side of said angle and in contact with the gear tooth under test whereby imperfections in said gear tooth will cause movement of the master tooth during the rolling action of the gear, and means for indicating the amount of movement of the master tooth.

11. In a device for testing bevel gear teeth, a master tooth, means for rolling the bevel gear under test about the apex of a conical angle corresponding to the conical angle of the gear with one of its teeth in rolling contact with the master tooth, said master tooth being free to move due to imperfections in the gear tooth under test, means for supporting the master tooth, and means for indicating the amount of said movement of the master tooth.

12. A device for testing bevel gear teeth as in claim 11 in which the supporting means for the master tooth includes a pivoted arm.

13. A device for testing bevel gear teeth as in claim 11 in which the supporting means for the master tooth includes a pivoted arm adjustable to different angles relatively to the axis of the gear under test.

14. A device for testing bevel gear teeth as in claim 11 in which the supporting means for the master tooth includes a slide adjustable transversely of the axis of the gear under test.

In witness whereof I have hereunto set my hand this 12th day of April, 1926.

CHARLES H. LOGUE.